United States Patent
El-Hibri et al.

(10) Patent No.: US 9,728,297 B2
(45) Date of Patent: Aug. 8, 2017

(54) MOBILE ELECTRONIC DEVICE

(71) Applicant: SOLVAY SPECIALTY POLYMERS USA, LLC, Alpharetta, GA (US)

(72) Inventors: Mohammad Jamal El-Hibri, Atlanta, GA (US); David B. Thomas, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 14/653,673

(22) PCT Filed: Dec. 18, 2013

(86) PCT No.: PCT/EP2013/077176
§ 371 (c)(1),
(2) Date: Jun. 18, 2015

(87) PCT Pub. No.: WO2014/096057
PCT Pub. Date: Jun. 26, 2014

(65) Prior Publication Data
US 2015/0348673 A1    Dec. 3, 2015

Related U.S. Application Data

(60) Provisional application No. 61/740,278, filed on Dec. 20, 2012.

(30) Foreign Application Priority Data

Feb. 12, 2013  (EP) ..................... 13154977

(51) Int. Cl.
| | |
|---|---|
| *A61F 2/02* | (2006.01) |
| *A61F 2/28* | (2006.01) |
| *A61F 2/36* | (2006.01) |
| *C08K 3/38* | (2006.01) |
| *H01B 3/36* | (2006.01) |
| *C08K 7/06* | (2006.01) |
| *H01B 3/47* | (2006.01) |
| *C08G 65/40* | (2006.01) |
| *C08L 71/00* | (2006.01) |

(52) U.S. Cl.
CPC ............... *H01B 3/36* (2013.01); *C08G 65/40* (2013.01); *C08G 65/4012* (2013.01); *C08K 3/38* (2013.01); *C08K 7/06* (2013.01); *C08L 71/00* (2013.01); *H01B 3/47* (2013.01); *C08G 2650/40* (2013.01); *C08K 2003/385* (2013.01); *Y10T 29/49004* (2015.01)

(58) Field of Classification Search
None
See application file for complete search history.

(56) References Cited

U.S. PATENT DOCUMENTS

| | | | | |
|---|---|---|---|---|
| 4,654,263 | A * | 3/1987 | Cox | C08K 3/38 428/366 |
| 2009/0163955 | A1 * | 6/2009 | Moumene | A61B 17/701 606/257 |
| 2010/0241166 | A1 * | 9/2010 | Dwyer | A61B 17/7068 606/249 |
| 2012/0270022 | A1 | 10/2012 | Alting et al. | |

FOREIGN PATENT DOCUMENTS

| | | |
|---|---|---|
| EP | 157466 A1 | 10/1985 |
| WO | 2006064032 A1 | 6/2006 |

OTHER PUBLICATIONS

CRC Handbook of Chemistry and Physics 96$^{th}$ edition, Electronegativity, p. 9-97.*
Weast R.C. in "Handbook of Chemistry and Physics", CRC Press, 1983, 64th Edition, pp. B-65 to B-158.
Murphy J., in "Additives for Plastics Handbook", 2nd Edition, 2001, Chapter 52.3., p. 43-48—Elsevier Advanced Technology.
Nassau K., "Color", Kirk-Othmer Encyclopedia of Chemical Technology, 2004, vol. 7, p. 303-341, John Wiley & Sons, Inc.

* cited by examiner

*Primary Examiner* — Peter A Salamon
(74) *Attorney, Agent, or Firm* — Jarrod N. Raphael; Dwight M. Benner II

(57) ABSTRACT

A mobile electronic device comprising at least one part made of a polymer composition [composition (C), herein after] comprising at least one part made of a polymer composition [composition (C), herein after] comprising from at least one polyaryletherketone polymer [(PAEK) polymer], and at least one nitride (NI) of an element having an electronegativity ($\in$) of from 1.3 to 2.5, as defined in <<Handbook of Chemistry and Physics>>, CRC Press, 64$^{th}$ edition, pages B-65 to B-158, based on the total weight of the composition (C).

15 Claims, No Drawings

MOBILE ELECTRONIC DEVICE

This application claims priority to U.S. provisional application No. 61/740,278 filed on 20 Dec. 2012 and to European application No. 13154977.6 filed on 12 Feb. 2013, the whole content of each of these applications being incorporated herein by reference for all purposes.

FIELD OF INVENTION

The present invention relates to mobile electronic devices comprising at least one part made of a poly(aryletherketone) polymer composition wherein said poly(aryletherketone) polymer composition is characterized by having improved mechanical properties, in particular high stiffness and high toughness and good aesthetical properties. The invention further relates to methods of manufacturing said mobile electronic devices and parts thereof.

BACKGROUND OF THE INVENTION

Electronic devices, and in particular mobile electronic devices, such as mobile telephones, personal digital assistants, laptop computers, tablet computers, global positioning system receivers, portable games, radios, cameras and camera accessories, and the like are becoming increasingly widely used in many different environments.

It is thus important that said electronic devices including their different parts such as notably the different electronic components and a plurality of cables for electrically connecting said electronic components are made from or coated with polymeric materials that are easy to process into the various parts and that said polymeric materials feature excellent mechanical properties, in particular an excellent balance of high stiffness/high toughness and which are ductile, chemical resistante, flame resistante, moisture resistante.

For example, semi-crystalline polyaryletherketone (PAEK) polymers could be regarded as such polymeric materials as they are known for their exceptional balance of technical properties, namely high melting point, good thermal stability, good stiffness and strength, good toughness and really excellent chemical resistance.

It is generally known that the stiffness of (PAEK) polymers can be increased by adding stiff materials such as reinforcing fillers, in particular glass fibers or carbon fibers but it has the drawback that said reinforced compositions often turn brittle.

It is also worthwhile mentioning that the parts of such mobile devices made from polymeric materials should be able to withstand the rigors of frequent use of such articles, should also comply with the severe fire-protection requirements and can especially meet challenging aesthetic demands such as notably having very low discoloration effects as well showing very minor degradation while not interfering with their intended operability.

Last but not least, the polymeric materials need to be as low in specific gravity as possible, particularly in large mobile units such as laptop computers. In these cases, the use of a glass fiber reinforced resin with a relatively high loading of glass reinforcement (i.e. 20% or more) can become disadvantageous from a unit weight and mobility standpoint as these reinforcements significantly increase the density of the composition relative to the corresponding unfilled polymer. Carbon fiber can mitigate this effect due to its lower density relative to glass fiber, but on the other hand carbon fiber-reinforced plastics have electrical conductivity which limits where in the mobile electronic device such a composition can be used. Furthermore, both glass fibers and carbon fibers when incorporated into a semi-crystalline rigid plastic like PEEK polymer, the commonly result in brittleness which makes the mobile device more vulnerable to breaks during usage. Another disadvantage of reinforcements like glass fibers and carbon fibers is the well known anisotropy effect of these materials. The anisotropic nature of bulk fiber reinforced plastics like glass fiber and carbon fiber, for example is that the composition has non-uniform properties over the various locations of the part, depending on how the fibers are oriented. Strength and stiffness properties are very high in the direction of flow or direction of alignment of the fibers and much weaker properties are realized perpendicular to the orientation of these fibers. The strong anisotropy just mentioned also leads to warpage issues in injection molded parts as different portions or dimensions of the part may shrink differently depending on the state of fiber alignment in that particular direction. There is therefore a need in the art for reinforcements or fillers that do not impart this kind of high anisotropic character to the compositions used in mobile electronic devices.

Thus, there is still a high need for mobile electronic devices comprising at least one part made of a polymeric composition that can overcome the drawbacks mentioned above and wherein said polymeric composition features excellent mechanical properties (and in particular good combination of high stiffness and high toughness, strength, elongation properties and impact resistance), having an excellent balance of stiffness and ductility, good processability, good flow, good thermal stability, low moisture uptake, increased dielectric strength and at the same time causing no discoloration or other degradation phenomena, and wherein said polymeric compositions provide thinner and lighter final parts and mobile electronic devices having improved properties such as more uniform crystallinity, improved ductility, impact resistance, higher tensile and flex modulus as well as strength, thus having the necessary structural integrity and breakage resistance required under the harsh drop testing conditions, having increased dielectric strength and moreover improved aesthetics, especially an improved, lighter color.

SUMMARY OF INVENTION

The present invention addresses the above detailed needs and relates to a mobile electronic device comprising at least one part made of a polymer composition [composition (C), herein after] comprising (i) at least one polyaryletherketone polymer [(PAEK) polymer], (ii) at least one nitride (NI) of an element having an electronegativity ($\in$) of from 1.3 to 2.5, as defined in <<Handbook of Chemistry and Physics>>, CRC Press, $64^{th}$ edition, pages B-65 to B-158.

The invention also pertains to a method for the manufacture of the above part of said mobile electronic device.

DETAILED DESCRIPTION OF THE PRESENT INVENTION

The term "mobile electronic device" is intended to denote an electronic device that is designed to be conveniently transported and used in various locations. Representative examples of mobile electronic devices include mobile electronic phones, personal digital assistants, laptop computers, tablet computers, radios, cameras and camera accessories, watches, calculators, music players, global positioning system receivers, portable games, hard drives and other electronic storage devices, and the like.

Preferred mobile electronic devices are laptop computers and mobile electronic phones.

The at least one part of the mobile electronic device according to the present invention may be selected from a large list of articles such as fitting parts, snap fit parts, mutually moveable parts, functional elements, operating elements, tracking elements, adjustment elements, carrier elements, frame elements, films, in particular speaker films, switches, connectors, cables, housings, and any other structural part other than housings as used in a mobile electronic devices, such as for example speaker parts. Said mobile electronic device parts can be notably produced by injection molding, extrusion or other shaping technologies.

In particular, the polymer composition (C) is very well suited for the production of cable sheats and housing parts of mobile electronic device.

Therefore, the at least one part of the mobile electronic device according to the present invention is advantageously a mobile electronic device housing or a mobile electronic device cable sheats.

A cable can be notably wires electrically connecting the different parts of the mobile electronic phone, as listed above or the different parts of the laptop computer, as listed above.

By "mobile electronic device cable sheaths" is meant one or more of the tubular shaped protective covering on a cable, as above described.

By "mobile electronic device housing" is meant one or more of the back cover, front cover, antenna housing, frame and/or backbone of a mobile electronic device. The housing may be a single article or comprise two or more components. By "backbone" is meant a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas.

In a preferred embodiment, the mobile electronic device housing is selected from the group consisting of a mobile phone housing, a tablet housing, a laptop computer housing and a tablet computer housing. Excellent results were obtained when the part of the mobile electronic device according to the present invention was a mobile phone housing and a laptop computer housing.

The at least one part of the mobile electronic device according to the present invention is advantageously characterized by a thickness of a flat portion of said part being 2.0 mm or less, preferably 1.6 mm or less, more preferably 1.2 mm or less, still more preferably 0.8 mm or less on average. The term "on average" is herein intended to denote the average thickness of the part based on the measurement of its thickness on at least 3 points of at least one of its flat portions.

The Polyaryletherketone Polymer

Within the context of the present invention the mention "at least one polyaryletherketone polymer [(PAEK) polymer]" is intended to denote one or more than one (PAEK) polymer. Mixtures of (PAEK) polymer can be advantageously used for the purposes of the invention.

In the rest of the text, the expressions "(PAEK) polymer" are understood, for the purposes of the present invention, both in the plural and the singular, that is to say that the inventive composition may comprise one or more than one (PAEK) polymer.

For the purpose of the invention, the term "polyaryletherketone (PAEK)" is intended to denote any polymer, comprising recurring units, more than 50% moles of said recurring units are recurring units ($R_{PAEK}$) comprising a Ar—C(O)—Ar' group, with Ar and Ar', equal to or different from each other, being aromatic groups. The recurring units ($R_{PAEK}$) are generally selected from the group consisting of formulae (J-A) to (J-O), herein below:

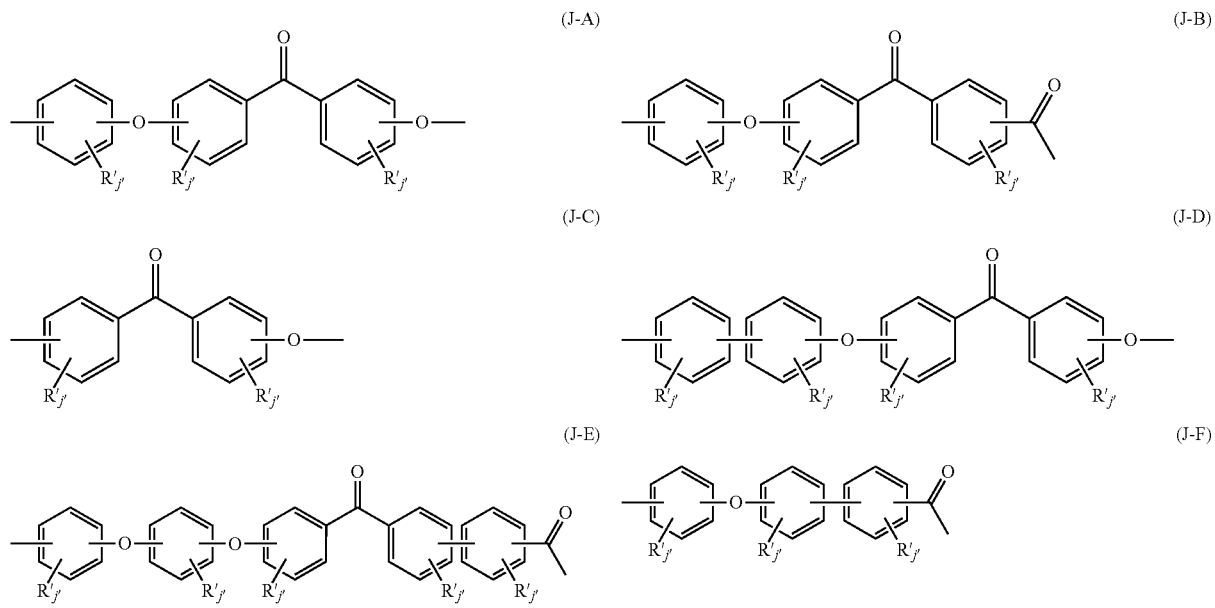

-continued

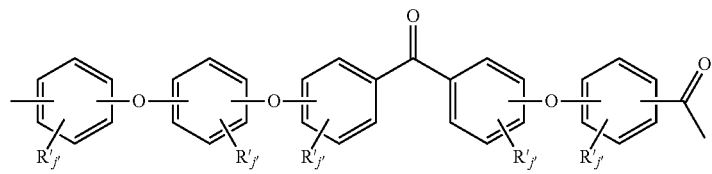
(J-G)

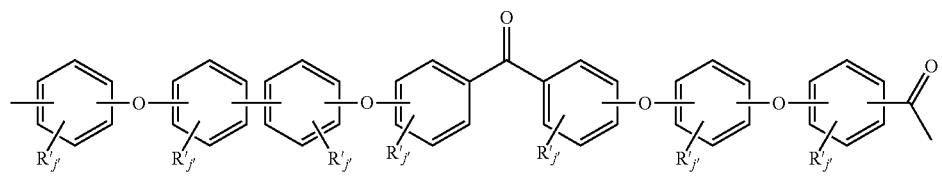
(J-H)

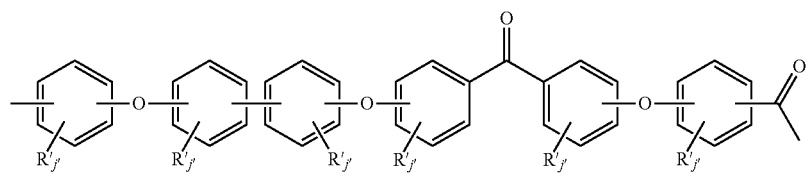
(J-I)

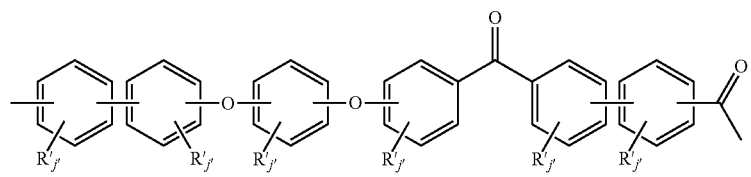
(J-J)

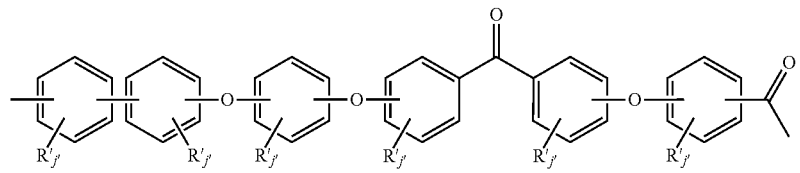
(J-K)

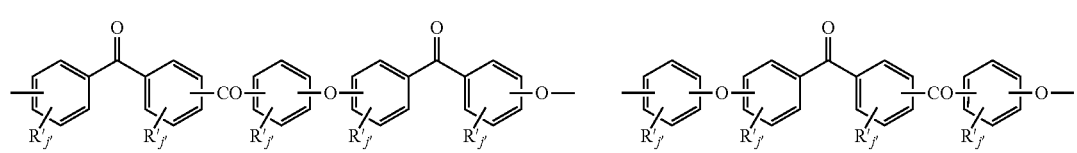
(J-L)        (J-M)

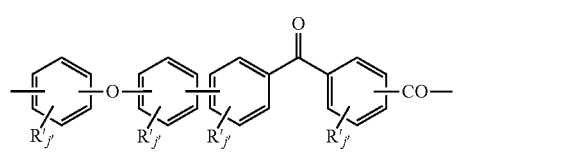  
(J-N)        (J-O)

wherein:
  each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
  j' is zero or is an integer from 0 to 4.

In recurring unit ($R_{PAEK}$), the respective phenylene moieties may independently have 1,2-, 1,4- or 1,3-linkages to the other moieties different from R' in the recurring unit.

Preferably, said phenylene moieties have 1,3- or 1,4-linkages, more preferably they have 1,4-linkage.

Still, in recurring units ($R_{PAEK}$), j' is at each occurrence zero, that is to say that the phenylene moieties have no other substituents than those enabling linkage in the main chain of the polymer.

Preferred recurring units ($R_{PAEK}$) are thus selected from those of formulae (J'-A) to (J'-O) herein below:

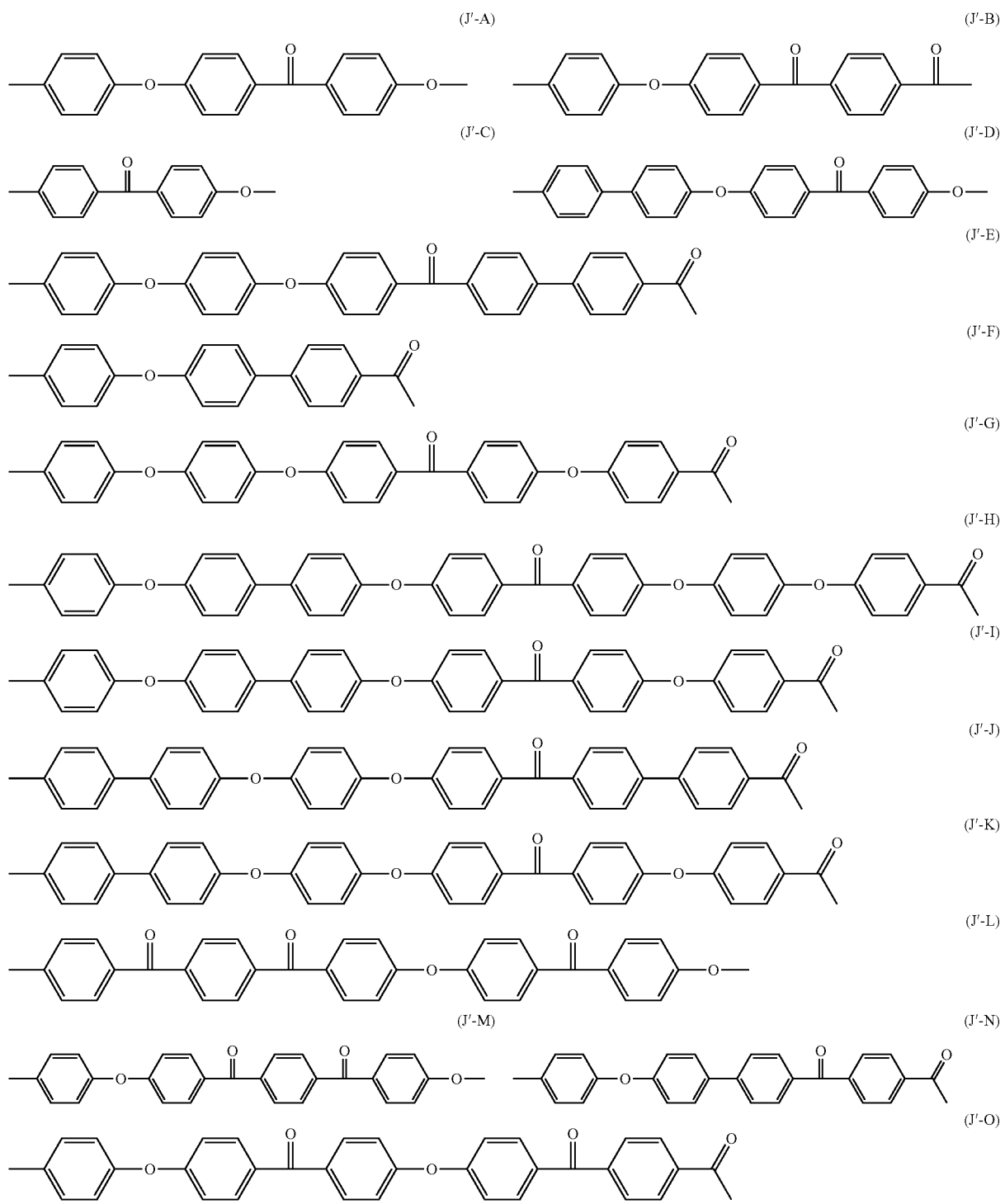

In the (PAEK) polymer, as detailed above, preferably more than 60%, more preferably more than 80%, still more preferably more than 90% moles of the recurring units are recurring units ($R_{PAEK}$), as above detailed.

Still, it is generally preferred that substantially all recurring units of the (PAEK) polymer are recurring units ($R_{PAEK}$), as detailed above; chain defects, or very minor amounts of other units might be present, being understood that these latter do not substantially modify the properties of ($R_{PAEK}$).

The (PAEK) polymer may be notably a homopolymer, a random, alternate or block copolymer. When the (PAEK) polymer is a copolymer, it may notably contain (i) recurring units ($R_{PAEK}$) of at least two different formulae chosen from formulae (J-A) to (J-O), or (ii) recurring units ($R_{PAEK}$) of one or more formulae (J-A) to (J-O) and recurring units ($R^*_{PAEK}$) different from recurring units ($R_{PAEK}$).

As will be detailed later on, the (PAEK) polymer may be a polyetheretherketone polymer [(PEEK) polymers, hereinafter]. Alternatively, the (PAEK) polymer may be a polyetherketoneketone polymer [(PEKK) polymer, herein after], a polyetherketone polymer [(PEK) polymer, hereinafter], a polyetherketoneketone polymer [(PEEKK) polymer, herein after], or a polyetherketoneetherketoneketone polymer [(PEKEKK) polymer, herein after].

The (PAEK) polymer may also be a blend composed of at least two different (PAEK) polymers chosen from the group consisting of (PEKK) polymers, (PEEK) polymers, (PEK) polymers and (PEKEKK) polymers, as above detailed.

For the purpose of the present invention, the term "(PEEK) polymer" is intended to denote any polymer of which more than 50% by moles of the recurring units are recurring units ($R_{PAEK}$) of formula J'-A.

Preferably more than 75% by moles, preferably more than 85% by moles, preferably more than 95% by moles, preferably more than 99% by moles of the recurring units of the (PEEK) polymer are recurring units of formula J'-A. Most preferably all the recurring units of the (PEEK) polymer are recurring units of formula J'-A.

For the purpose of the present invention, the term "(PEKK) polymer" is intended to denote any polymer of which more than 50% by moles of the recurring units are recurring units ($R_{PAEK}$) of formula J'-B.

Preferably more than 75% by moles, preferably more than 85% by moles, preferably more than 95% by moles, preferably more than 99% by moles of the recurring units of the (PEKK) polymer are recurring units of formula J'-B. Most preferably all the recurring units of the (PEKK) polymer are recurring units of formula J'-B.

For the purpose of the present invention, the term "(PEK) polymer" is intended to denote any polymer of which more than 50% by moles of the recurring units are recurring units ($R_{PAEK}$) of formula J'-C.

Preferably more than 75% by moles, preferably more than 85% by moles, preferably more than 95% by moles, preferably more than 99% by moles of the recurring units of the (PEK) polymer are recurring units of formula J'-C. Most preferably all the recurring units of the (PEK) polymer are recurring units of formula J'-C.

For the purpose of the present invention, the term "(PEEKK) polymer" is intended to denote any polymer of which more than 50% by moles of the recurring units are recurring units ($R_{PAEK}$) of formula J'-M.

Preferably more than 75% by moles, preferably more than 85% by moles, preferably more than 95% by moles, preferably more than 99% by moles of the recurring units of the (PEEKK) polymer are recurring units of formula J'-M. Most preferably all the recurring units of the (PEEKK) polymer are recurring units of formula J'-M.

For the purpose of the present invention, the term "(PEKEKK) polymer" is intended to denote any polymer of which more than 50% by moles of the recurring units are recurring units ($R_{PAEK}$) of formula J'-L.

Preferably more than 75% by moles, preferably more than 85% by moles, preferably more than 95% by moles, preferably more than 99% by moles of the recurring units of the (PEKEKK) polymer are recurring units of formula J'-L. Most preferably all the recurring units of the (PEKEKK) polymer are recurring units of formula J'-L.

Excellent results were obtained when the (PAEK) polymer was a (PEEK) homopolymer, i.e. a polymer of which substantially all the recurring units of the (PEEK) polymer are recurring units of formula J'-A, wherein chain defects, or very minor amounts of other units might be present, being understood that these latter do not substantially modify the properties of the (PEEK) homopolymer.

Non limitative examples of commercially available polyarylether ketone (PAEK) resins suitable for the invention include the KETASPIRE® polyetheretherketone commercially available from Solvay Specialty Polymers USA, LLC.

The (PAEK) polymer can have a intrinsic viscosity (IV) of at least 0.50 dl/g, preferably at least 0.60 dl/g, more preferably at least 0.70 dl/g, as measured in 95-98% sulfuric acid (d=1.84 g/ml) at a (PAEK) polymer concentration of 0.1 g/100 ml.

The IV of the (PAEK) polymer can notably be equal to or less than 1.40 dl/g, preferably equal to or less than 1.30 dl/g, more preferably equal to or less than 1.20 dl/g, most preferably equal to or less than 1.15 dl/g, as measured in 95-98% sulfuric acid (d=1.84 g/ml) at a (PAEK) polymer concentration of 0.1 g/100 ml.

Good results have been obtained with (PAEK) polymers having an IV from 0.70 dl/g to 1.15 dl/g, as measured in 95-98% sulfuric acid (d=1.84 g/ml) at a (PAEK) polymer concentration of 0.1 g/100 ml.

The measurement is generally performed using a No 50 Cannon-Fleske viscometer; IV is measured at 25° C. in a time less than 4 hours after dissolution.

The (PAEK) polymer has a melt viscosity of advantageously at least 0.05 kPa·s, preferably at least 0.08 kPa·s, more preferably at least 0.1 kPa·s, still more preferably at least 0.12 kPa·s at 400° C. and a shear rate of 1000 $s^{-1}$, as measured using a capillary rheometer in accordance with ASTM D3835.

As capillary rheometer, a Kayeness Galaxy V Rheometer (Model 8052 DM) can be used.

The PAEK polymer has a melt viscosity of advantageously at most 1.00 kPa·s, preferably at most 0.80 kPa·s, more preferably at most 0.70 kPa·s, even more preferably at most 0.60 kPa·s at 400° C. and a shear rate of 1000 $s^{-1}$, as measured using a capillary rheometer in accordance with ASTM D3835.

The (PAEK) polymer can be prepared by any method known in the art for the manufacture of poly(aryl ether ketone)s.

The Nitride (NI)

Within the context of the present invention the mention "at least one nitride (NI)" is intended to denote one or more than one nitride (NI). Mixtures of nitrides (NI) can be advantageously used for the purposes of the invention.

For the purpose of the present invention, an "element" is intended to denote an element from the Periodic Table of the Elements.

The value of the electronegativity of an element that are to be taken into consideration for the purpose of the present invention are those reported in the Periodic Table of the Elements edited by J. Breysem, c/o VEL s.a., "Produits, appareillage et fournitures pour le laboratoire", printed in Belgium in February 1987.

Non limitative examples of nitrides (NI) of an element having an electronegativity ($\in$) of from 1.3 to 2.5 are listed <<Handbook of Chemistry and Physics>>, CRC Press, $64^{th}$ edition, pages B-65 to B-158. The code into brackets is the one attributed by the CRC Handbook to the concerned nitride, while $\in$ denotes the electronegativity of the element from which the nitride is derived. Then, nitrides (NI) of an element having an electronegativity ($\in$) of from 1.3 to 2.5 suitable to the purpose of the present invention are notably aluminum nitride (AlN, a45, $\in$=1.5), antimony nitride (SbN, a271, $\in$=1.9), beryllium nitride ($Be_3N_2$, b123, $\in$=1.5), boron nitride (BN, b203, $\in$=2.0), chromium nitride (CrN, c406, $\in$=1.6), copper nitride ($Cu_3N$, c615, $\in$=1.9), gallium nitride (GaN, g41, $\in$=1.6), trigermanium dinitride ($Ge_3N_2$, g82, ∈=1.8), trigermanium tetranitride (Ge$_3$N$_4$, g83, ∈=1.8), hafnium nitride (HfN, h7, ∈=1.3), iron nitrides like Fe$_4$N (i151, ∈=1.8) and Fe$_2$N or Fe$_4$N$_2$ (i152, ∈=1.8), mercury nitride (Hg$_3$N$_2$, m221, ∈=1.9), niobium nitride (n109, ∈=1.6), silicium nitride (Si$_3$N$_4$, s109, ∈=1.8), tantalum nitride (TaN, t7, ∈=1.5), titanium nitride (Ti$_3$N$_4$, t249, ∈=1.5), wolfram dinitride (WN$_2$, t278, ∈=1.7), vanadium nitride (VN, v15, ∈=1.6), zinc nitride (Zn$_3$N$_2$, z50, ∈=1.6) and zirconium nitride (ZrN, z105, ∈=1.4).

The nitride (NI) is a nitride of an element having an electronegativity of preferably at least 1.6, and more preferably at least 1.8. In addition, the nitride (NI) is the nitride of an element having an electronegativity of preferably at most 2.2.

Besides, the nitride (NI) is chosen preferably from nitrides of an element chosen from Groups IIIa, IVa, IVb, Va, Vb, VIa, VIb, VIIb and VIII of the Periodic Table of the Elements, and more preferably from nitrides of an element of Group IIIa of the Periodic Table of the Elements.

The most preferred nitride (NI) is boron nitride.

The Applicant has surprisingly found that the presence of the nitride (NI), as described above, is effective in enhancing the stiffness of the composition (C) while maintaining the ductility of an unfilled PAEK polymer, thereby offering said composition (C) of the invention superior properties which allows them to be very useful as being comprised in parts of mobile electronic devices.

The Applicant has found that the average particle size of the nitride (NI) may play a role in improving mechanical properties such as in particular the stiffness and the tensile elongation at break of the composition (C) and in improving the aesthetics aspects, especially in improved the color of the composition (C).

The average particle size of the nitride (NI) is advantageously equal to or below 30 μm, preferably equal to or below 20 μm, more preferably equal to or below 18 μm, more preferably equal to or below 10 μm.

The average particle size of the nitride (NI) is preferably equal to or at least 0.05 μm, equal to or at least 0.1 μm, more preferably equal to or at least 0.2 μm, equal to or at least 1 μm.

The average particle size of the nitride (NI) is preferably from 1 μm to 20 μm, more preferably from 2 μm to 18 μm, more preferably from 2 μm to 10 μm.

An average particle size of the nitride (NI) of about 2.5 μm gave particularly good results.

The average particle size of the nitride (NI) is measured via light scattering techniques (dynamic or laser) using the respective equipment coming for example from the company Malvern (Mastersizer Micro or 3000) or using screen analysis according to DIN 53196.

Composition (C)

The composition (C) of the present invention advantageously comprises the nitride (NI) in an amount of at least 1.0% wt, preferably at least 1.10% wt, more preferably at least 2.0% wt, most preferably at least 5.0% wt based on the total weight of the composition (C).

As such, there is no upper limit on the amount of the nitride (NI) present in the composition (C) of the present invention.

In one embodiment, the composition (C) of the present invention advantageously comprises the nitride (NI) in an amount of at most 50.0% wt, preferably at most 40.0% wt, more preferably at most 30.0% wt, even more preferably at most 20.0% wt, still more preferably at most 15.0% wt, and most preferably at most 10.0% wt, based on the total weight of the composition (C).

The composition (C) of the present invention advantageously comprises the nitride (NI) in an amount ranging from 2 to 50% wt, more preferably from 5 to 20% wt, even more preferably from 5 to 10% wt, based on the total weight of the composition (C).

The total weight of the (PAEK) polymer, based on the total weight of the composition (C), is advantageously above 50%, preferably above 60%; more preferably above 70%; more preferably above 80%, more preferably above 85%.

If desired, the composition (C) consists of the (PAEK) polymer and the nitride (NI).

A preferred composition (C) of the invention thus includes a (PAEK) polymer, as above detailed, and more preferably a (PAEK) polymer comprising recurring units (R$_{PAEK}$) of formula (J'-A), as above detailed and boron nitride in an amount of 5 to 15% wt, based on the total weight of the composition (C).

The composition (C) of the present invention may further comprise at least one other thermoplastic polymer (polymer T).

Non limitative examples of polymers (T) suitable for use in composition (C) of the present invention, include for example polyarylethersulfones, polyphenylenes, polyimides, more notably polyetherimides, and polyphenylene sulfides.

The weight of said other polymers is advantageously below 40% wt, preferably below 30% wt, and more preferably below 25% wt based on the total weight of the composition (C).

The composition (C) can further comprise one or more ingredients other than the (PAEK) polymer [ingredient (I), herein after].

Non limitative examples of ingredient (I) suitable for use in composition (C) of the present invention, are polymeric compositions, additives such as UV absorbers; stabilizers such as light stabilizers and heat stabilizers; antioxidants; lubricants; processing aids; plasticizers; flow modifiers; flame retardants; pigments such as notably titanium dioxide (TiO$_2$); dyes; colorants; anti-static agents; extenders; metal deactivators; conductivity additive such as carbon black and carbon nanofibrils and combinations comprising one or more of the foregoing additives.

The weight of said ingredient (I) is advantageously below 10% wt and preferably below 5% wt, based on the total weight of the composition (C).

If desired, the composition (C) comprises more than 80 wt % of the (PAEK) polymer with the proviso that the (PAEK) polymer is the only polymeric components in the composition (C) and one or more optional ingredient such as notably UV absorbers; stabilizers such as light stabilizers and heat stabilizers; antioxidants; lubricants; processing aids; plasticizers; flow modifiers; flame retardants; pigments such as notably titanium dioxide (TiO$_2$); dyes; colorants; anti-static agents; extenders; metal deactivators; conductivity additive such as carbon black and carbon nanofibrils might be present therein, without these components dramatically affecting relevant mechanical and toughness properties of the composition (C).

The expression 'polymeric components' is to be understood according to its usual meaning, i.e. encompassing compounds characterized by repeated linked units, having typically a molecular weight of 2 000 or more.

The polymer composition (C) may further comprise at least one reinforcing filler. Reinforcing fillers are well known by the skilled in the art. They are preferably selected from fibrous and particulate fillers different from the pigment as defined above. More preferably, the reinforcing filler is selected from mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite etc. Still more preferably, it is selected from mica, kaolin, calcium silicate, magnesium carbonate, glass fiber, carbon fibers and wollastonite etc.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition (C) may have a circular cross-section or a non-circular cross-section (such as an oval or rectangular cross-section).

When the glass fibers used have a circular cross-section, they preferably have an average fiber diameter of 3 to 30 µm and particularly preferred of 5 to 12 µm. Different sorts of glass fibers with a circular cross-section are available on the market depending on the type of the glass they are made of. One may notably cite glass fibers made from E- or S-glass.

Good results were obtained with standard E-glass material with a non-circular cross section. Excellent results were obtained when the polymer composition with S-glass fibers with a round cross-section and, in particular, when using round cross-section with a 6 µm diameter (E-Glass or S-glass).

In another embodiment of the present invention the reinforcing filler is a carbon fiber.

As used herein, the term "carbon fiber" is intended to include graphitized, partially graphitized and ungraphitized carbon reinforcing fibers or a mixture thereof. Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers useful for the present invention are preferably chosen from the group composed of PAN-based carbon fibers, pitch based carbon fibers, graphite fibers, and mixtures thereof.

The weight of said reinforcing filler is advantageously preferably below 60% wt, more preferably below 50% wt, even more preferably below 45% wt, most preferably below 35% wt, based on the total weight of the composition (C).

Preferably, the reinforcing filler is present in an amount ranging from 10 to 60% wt, preferably from 20 to 50% wt, preferably from 25 to 45% wt, most preferably from 25 to 35% wt, based on the total weight of the polymer composition (C).

The composition (C) can be prepared by a variety of methods involving intimate admixing of the polymer materials with any optional ingredient, as detailed above, desired in the formulation, for example by melt mixing or a combination of dry blending and melt mixing. Typically, the dry blending of the (PAEK) polymer and the nitride (NI), and optionally the polymers (T), optionally the reinforcing filler and optionally ingredient (I), as above details, is carried out by using high intensity mixers, such as notably Henschel-type mixers and ribbon mixers.

So obtained powder mixture can comprise the (PAEK) polymer and the nitride (NI), and optionally the polymers (T), optionally the reinforcing filler and optionally ingredient (I), in the weight ratios as above detailed, suitable for obtaining effective formation of the above described parts of a mobile electronic device, or can be a concentrated mixture to be used as masterbatch and diluted in further amounts of the (PAEK) polymer and the nitride (NI), and optionally the polymers (T), optionally the reinforcing filler and optionally ingredient (I) in subsequent processing steps.

It is also possible to manufacture the composition of the invention by further melt compounding the powder mixture as above described. As said, melt compounding can be effected on the powder mixture as above detailed, or preferably directly on the (PAEK) polymer and the nitride (NI), and optionally the polymers (T), optionally the reinforcing filler and optionally ingredient (I). Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents. It is advantageously possible to obtain strand extrudates which are not ductile of the composition (C) of the invention. Such strand extrudates can be chopped by means e.g. of a rotating cutting knife after some cooling time on a conveyer with water spray. Thus, for example composition (C) which may be present in the form of pellets or beads can then be further used for the manufacture of the above described part of a mobile electronic device.

Another objective of the present invention is to provide a method for the manufacture of the above described part of a mobile electronic device. Such method is not specifically limited. The polymer composition (C) may be generally processed by injection molding, extrusion or other shaping technologies.

In one embodiment of the present invention, the method for the manufacture of the above described part of a mobile electronic device includes the step of injection molding and solidification of the polymer composition (C).

In another embodiment of the present invention, the method for the manufacture of the above described part of a mobile electronic device includes the machining of a standard shaped structural part in a part having any type of size and shape. Non limiting examples of said standard shaped structural part include notably a plate, a rod, a slab and the like. Said standard shaped structural parts can be obtained by extrusion or injection molding of the polymer composition (C).

Another object of the invention is a part of a mobile electronic device comprising the polymer composition as above described.

The Applicant has found unexpectedly that the composition (C) of the present invention is effective in providing electronic device parts having an excellent balance of high stiffness and ductility, and improved impact resistance over prior art mobile electronic device parts.

The Applicant has also found that said mobile electronic device parts comprising the composition (C) of the present invention have improved dielectric strength.

The Applicant has also found that said mobile electronic device parts comprising the composition (C) of the present invention have improved aesthetics, in particular improved lighter color and said mobile electronic device parts have a higher acceptance for many applications where color is a concern.

The mobile electronic device parts of the present invention have advantageously the following color characteristics:

Color L*>70, preferably L*>71;
Color b* is at least 8 where the color was measured on injection moulded color plaques that are 2.5 mm in thickness using the CIE Lab standards, as follows. The color is generally characterized by L*, a*, b* values, which are tristimulus coordinates defined by the CIE (Commission Internationale de l'Eclairage) in 1976 (K. Nassau, in "Kirk-Othmer Encyclopedia of Chemical Technology", 2004, Chapter 7, P 303-341). These three basic coordinates represent the lightness of the color (L*, L*=0 yields black and L*=100 indicates white), its position between red/magenta and green (a*, negative values indicate green while positive values indicate magenta) and its position between yellow and blue (b*, negative values indicate blue and positive values indicate yellow).

The parts of the mobile electronic devices according to the present invention may be coated with metal by any known methods for accomplishing that, such as vacuum deposition (including various methods of heating the metal to be deposited), electroless plating, electroplating, chemical vapor deposition, metal sputtering, and electron beam deposition. Although the metal may adhere well to the parts without any special treatment, usually some well known in the art method for improving adhesion will be used. This may range from simple abrasion of the synthetic resin surface to roughen it, addition of adhesion promotion agents, chemical etching, functionalization of the surface by exposure to plasma and/or radiation (for instance laser or UV radiation) or any combination of these. Also, some of the metal coating methods comprise at least one step where the part is immersed in an acid bath. More than one metal or metal alloy may be plated onto the parts made of the polymer composition (C), for example one metal or alloy may be plated directly onto the synthetic resin surface because of its good adhesion, and another metal or alloy may be plated on top of that because it has a higher strength and/or stiffness. Useful metals and alloys to form the metal coating include copper, nickel, iron-nickel, cobalt, cobalt-nickel, and chromium, and combinations of these in different layers. Preferred metals and alloys are copper, nickel, and iron-nickel, and nickel is more preferred. The surface of the part may be fully or partly coated with metal. Preferably more than 50 percent of the surface area will be coated, more preferably all of the surface will be coated. In different areas of the part the thickness and/or the number of metal layers, and/or the composition of the metal layers may vary. The metal may be coated in patterns to efficiently improve one or more properties in certain sections of the part.

Another objective of the present invention is to provide a method for the manufacture of the above described mobile electronic device comprising at least one part comprising the polymer composition (C), said method including the steps of:

providing as components at least a circuit board, a screen and a battery;
providing at least one part comprising the polymer composition (C);
assembling at least one of said components with said part or mounting at least one of said components on said part.

Mobile electronic devices are very often commercialized in a black color. However, there is a growing market interest in colored mobile electronic devices. The present invention allows the manufacture of colored mobile electronic device, and in particular colored mobile electronic device housings.

The above described method for the manufacture of the mobile electronic device may thus further include an additional step of painting or coating said part comprising the polymer composition (C).

Excellent results were obtained when the mobile electronic device was first painted with a primer coating paint and then with a top coating paint. These coatings gave surprisingly excellent results in adhesion tests. In addition, the present invention provides the great benefit that the polymer composition (C) has an excellent colorability using the above described pigments and also an excellent paintability using the above mentioned paints.

Should the disclosure of any patents, patent applications, and publications which are incorporated herein by reference conflict with the description of the present application to the extent that it may render a term unclear, the present description shall take precedence.

The invention will be now described in more details with reference to the following examples, whose purpose is merely illustrative and not intended to limit the scope of the invention.

Raw Materials

KetaSpire® PEEK KT-820P is polyetheretherketone polymer commercially available from Solvay Specialty Polymers USA, LLC.
Boron Nitride, Boronid® S1-SF commercially available from ESK Ceramics, GmbH, average particle size of 2.5 µm.
Boron Nitride, Boronid® S15 commercially available from ESK Ceramics, GmbH, average particle size of 15 µm.
Carbon Fiber, Sigrafil C30 APS 006 from SGL Corporation
Talc, Mistron Vapor R, commercially available from Luzenac America
General Description of the Compounding Process of PEEK Resins A dry blend of PEEK resins with the desired amounts of Boronid® S1-SF or Boronid® S15 were prepared by first tumble blending for about 20 minutes, followed by melt compounding using an 25 mm Berstorff co-rotating partially intermeshing twin screw extruder having an L/D ratio of 40:1. The extruder had 8 barrel sections with barrel sections 2 through 8 being heated sections. Vacuum venting was applied at barrel section 7 with 18-20 in of vacuum during compounding to strip off moisture and any possible residual volatiles from the compound. The compounding temperature profile was such that barrel sections 2-5 were set at 330° C. while barrel sections 5-8 and the die adapter were set at 340° C. The screw speed used 180 throughout and the throughput rate was 15-17 lb/hr, whereas the melt temperature, measured manually for each formulation molten extrudate, at the exit of the extruder die ranged from 398 to 402° C. The extrudate for each formulation was cooled in a water trough and then pelletized using a pelletizer. The thus obtained pellets of the four blends were next dried for 4 hours in a desiccated air oven at 150° C. and subjected to mechanical testing. Said pellets were injection-molded to produce ASTM test specimens using a Toshiba 150 ton injection molding machine following standard conditions and guidelines for KetaSpire KT-820 PEEK resin provided by the supplier Solvay Specialty Polymers.

Mechanical properties were tested for all the formulations using injection molded 0.125 inch thick ASTM test specimens which consisted of 1) Type I tensile bars, 2) 5 in×0.5 in×0.125 in flexural bars, and 3) 4 in×4 in×0.125 in plaques for the instrumented impact (Dynatup) testing.

The following ASTM test methods were employed in evaluating all nine compositions:
D638: Tensile properties using a test speed of 2 in/min
D790: Flexural properties Thus, the L, a and b color coordinates measured by this test correspond to the lightness scale (L), green-red hue scale (a) and the blue-yellow hue scale (b).

Dielectric strength measurements according to the D149 ASTM method were carried out for the formulations of comparative example 1 and examples 4, 5, 6 and 7 on 4 in×4 in×0.125 in injection molded thick ASTM test specimens. The results are shown in Table 1.

Composition, mechanical properties, color properties and physical properties of the nine compositions are summarized in Table 1.

TABLE 1

| Examples | Comp. example 1 (C1) | 2 | 3 | 4 | 5 | 6 | 7 | 8 | 9 |
|---|---|---|---|---|---|---|---|---|---|
| KetaSpire KT-820P PEEK (wt %) | 100.0 | 99.5 | 98.8 | 97.5 | 95.0 | 92.5 | 90.0 | 95.0 | 90.0 |
| Boron Nitride, Boronid ® S1-SF (wt %) | — | 0.5 | 1.2 | 2.5 | 5.0 | 7.5 | 10.0 | | |
| Boron Nitride, Boronid ® S15 (wt %) | | | | | | | | 5.0 | 10.0 |
| Mechanical properties | | | | | | | | | |
| Tensile Yield Strength (psi) | 13555 | 13600 | 13700 | 13715 | 13610 | 13630 | 13640 | 13550 | 13600 |
| Tensile Modulus (Ksi) | 536 | 558 | 580 | 611 | 679 | 759 | 839 | 675 | 830 |
| Tensile Yield Elongation (%) | 5.1 | 5.0 | 4.9 | 5.0 | 4.9 | 4.80 | 4.7 | 4.9 | 4.7 |
| Tensile Elongation at Break (%) | 24 | 35 | 31 | 33 | 40 | 46 | 41 | 23 | 23 |
| Flexural Strength (psi) | 20675 | 21000 | 21300 | 21675 | 21320 | 22310 | 22860 | | |
| Flexural Modulus (Ksi) | 532 | 558 | 573 | 601 | 625 | 710 | 775 | | |
| Notched Izod (ft-lb/in) | 1.77 | 1.51 | 1.45 | 1.77 | 2.15 | 2.12 | 2.07 | 1.83 | 1.79 |
| No Notch Izod (ft-lb/in) | NB | NB | NB | NB | NB | NB | NB | NB | NB |
| Dynatup - Total Energy (ft-lb) | 52.0 | 57.7 | 55.6 | 53.5 | 51.5 | 53.7 | 50.6 | 51.0 | 38.4 |
| Dynatup - Max. Load (lb) | 1426 | — | — | 1499 | 1513 | 1547 | 1640 | 1627 | 1478 |
| Dynatup - Energy at Max Load (ft-lb) | 39.0 | — | — | 41.1 | 40.1 | 42.8 | 44.0 | 45.0 | 36.0 |
| Dynatup - Max. Deflection (in) | 0.64 | — | — | 0.64 | 0.62 | 0.64 | 0.62 | 0.64 | 0.56 |
| Color properties | | | | | | | | | |
| CIE Lab L* Color Value | 65.2 | 68.9 | 71.1 | 73.0 | 76.1 | 78.3 | 79.6 | 70.5 | 73.3 |
| CIE Lab a* Color Value | 1.76 | 1.74 | 1.40 | 1.38 | 1.27 | 1.11 | 0.98 | 1.82 | 1.52 |
| CIE Lab b* Color Value | 7.07 | 7.45 | 8.58 | 9.95 | 10.76 | 11.02 | 11.15 | 11.13 | 12.09 |
| Physical properties | | | | | | | | | |
| DMA Storage Modulus at 200° C. (Pa) | 1.30 E8 | — | — | 1.80 E8 | 2.11 E8 | 2.65 E8 | 1.81 E8 | 2.46 E8 | 1.80 E8 |
| HDT [Annealed 200° C./2 h] (° C.) | 158° C. | — | — | 162° C. | 163° C. | 165° C. | 161° C. | 167° C. | 162° C. |
| Dielectric strength properties | | | | | | | | | |
| Dielectric Strength (V/mil) | 371 | | | 458 | 540 | 666 | 661 | | |

NB = No break

D256: Izod impact resistance (notched)
D4812: Izod impact resistance (unnotched)
D3763: Instrumented impact resistance also known by the name Dynatup impact
D648: Heat deflection temperature (HDT)
D5279: DMA Storage Modulus at 200° C. (Pa)

HDT was measured at an applied stress of 264 psi and using 0.125 in-thick flexural specimens annealed at 200° C. for 2 hours to assure uniform crystallinity and removal of residual molded-in stresses in the parts which can otherwise compromise the accuracy of the measurement.

The color of 4 in×4 in×0.125 injection molded plaques injection molded color plaques was measured according to ASTM E308-06 using illuminant D65 (white light simulating daylight) at 10° angle (1964 CIE).

L*, a* and b* color coordinates were measured using a Gretag Macbeth Color Eye Ci5 Spectrophotometer, with tribeam diffuse/8 "6" sphere optical geometry, a bandpass of 10 nm, a spectral range of 360 nm to 750 nm per CIE Lab standards using illuminant D65 and a 10 degree observer.

General Description of the Compounding Process of Carbon Fiber Reinforced PEEK Resins Carbon fiber-reinforced PEEK formulations described in Table 2 were prepared by melt compounding using a twin screw co-rotating intermeshing extruder equipped with 8 barrel sections and an overall L/D ratio of 40. The PEEK powder was tumble blended with either the boron nitride or fed as is (in the case of the Control) in the feed hopper of the extruder. The carbon fiber was fed gravimetrically at the required proportion and was metered at a feed port on barrel section 5 of the extruder. A vacuum vent port at barrel section 7 was used to pull high vacuum on the melt to remove any residual moisture or organic volatiles that may evolve from the sizing of the carbon fiber. The compounded formulations were stranded using a one-hole 3 mm diameter and were cooled on a conveyor belt with a water spray before being fed to a pelletizer to chop the extrudate into pellets. Details of the compounding conditions are shown in Table 3.

TABLE 2

Properties of carbon fiber reinforced PEEK modified with talc and with boron nitride

| | Examples | | |
|---|---|---|---|
| | Comparative Example 10 (C10) | 11 | Comparative Example 12 (C12) |
| KetaSpire KT-820P PEEK | 70.0 | 68.6 | 68.6 |
| Boron Nitride, Boronid ® S1-SF | — | 2.0 | — |
| Talc, Mistron Vapor R | — | — | 2.0 |
| Carbon Fiber, SGL C30 APS 006 | 30.0 | 29.4 | 29.4 |
| Mechanical properties | | | |
| Tensile Strength (psi) @0.2"/min | 32050 | 31410 | 30920 |
| Tensile Modulus (Ksi) | 3413 | 3470 | 3407 |
| Tensile Elongation at Break (%) | 2.17 | 2.32 | 2.24 |
| Flex Strength (psi) | 50290 | 49310 | 48970 |
| Flex Modulus (Ksi) | 2684 | 2729 | 2689 |
| Flex Strain at Break (%) | 2.58 | 2.61 | 2.56 |
| Notched Izod (ft-lb/in) | 1.76 | 1.63 | 1.55 |
| No Notch Izod (ft-lb/in) | 15.5 | 16.1 | 15.9 |

TABLE 3

Compounding conditions and process parameters used to make formulations listed in Table 3.

| | Examples | | |
|---|---|---|---|
| Barrel Zone Temperatures (° C.) | Comparative Example 10 (C10) | 11 | Comparative Example 12 (C12) |
| Barrel Section 1 | No Heat | No Heat | No Heat |
| Barrel Section 2 (Set Point/Actual) | 330/329 | 330/330 | 330/329 |
| Barrel Section 3 (Set Point/Actual) | 330/330 | 330/330 | 330/330 |
| Barrel Section 4 (Set Point/Actual) | 330/331 | 330/330 | 330/331 |
| Barrel Section 5 (Set Point/Actual) | 330/334 | 330/332 | 330/332 |
| Barrel Section 6 (Set Point/Actual) | 340/343 | 340/342 | 340/341 |
| Barrel Section 7 (Set Point/Actual) | 340/342 | 340/342 | 340/340 |
| Barrel Section 8 (Set Point/Actual) | 340/340 | 340/342 | 340/341 |
| Adapter (Set Point/Actual) | 340/340 | 340/341 | 340/341 |
| Die (Set Point/Actual) | 340/340 | 340/341 | 340/341 |
| Actual Melt Temperature (° C.) | 402 | 407 | 423 |
| Screw Speed (rpm) | 230 | 230 | 235 |
| Vent Vacuum on BBL Section 7 (in Hg) | 29 | 29 | 29 |
| Feed Rate, Main (lb/hr) | 7.0 | 7.06 | 7.06 |
| Feed Rate, Carbon Fiber (lb/hr) | 3.0 | 2.94 | 2.94 |
| Feed Rate, Total (lb/hr) | 10.0 | 10.0 | 10.0 |

The invention claimed is:

1. A mobile electronic device comprising at least one part made of a polymer composition (C), the polymer composition (C) comprising:
   (i) at least one polyaryletherketone polymer, (PAEK) polymer; and
   (ii) at least one nitride (NI) of an element having an electronegativity (∈) of from 1.3 to 2.5, as defined in <<Handbook of Chemistry and Physics>>, CRC Press, 64$^{th}$ edition, pages B-65 to B-158.

2. The mobile electronic device according to claim 1, wherein more than 50% moles of recurring units of the (PAEK) polymer are recurring units ($R_{PAEK}$) selected from those of formulae (J-A) to (J-O):

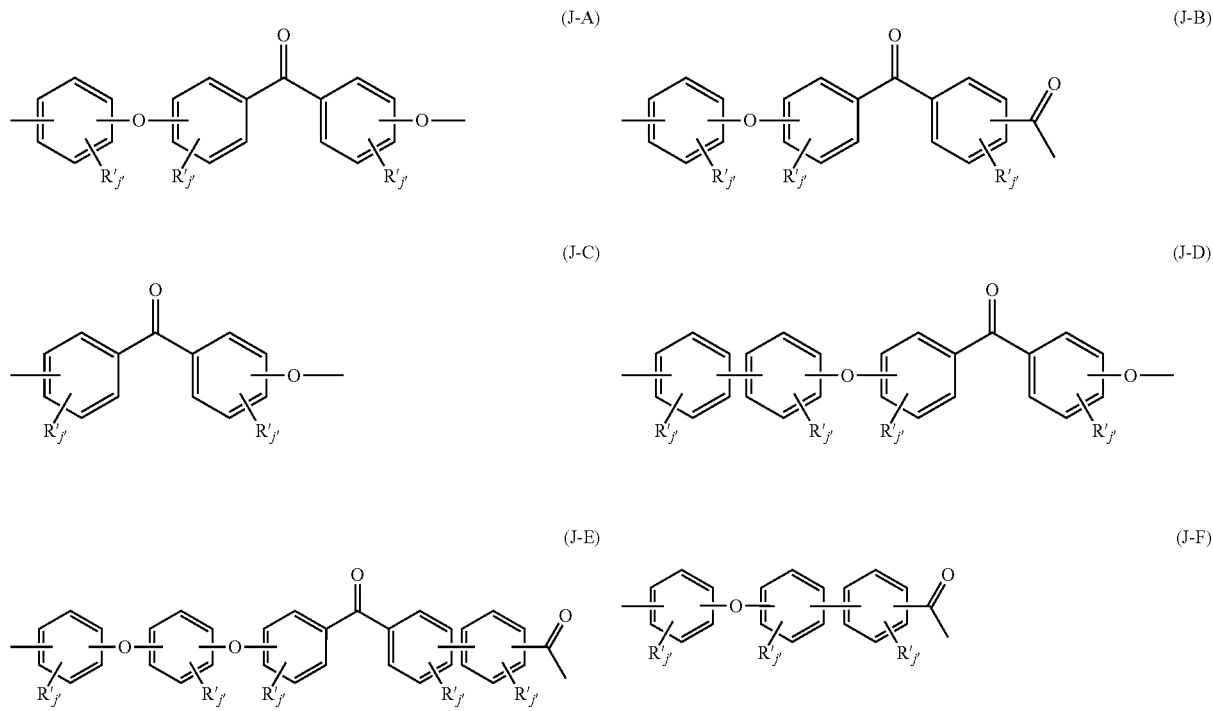

-continued

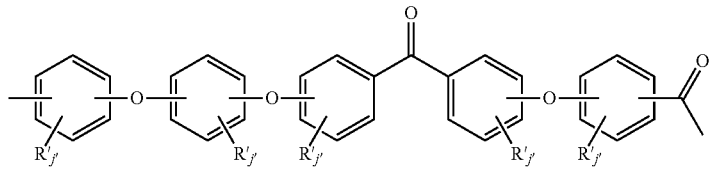
(J-G)

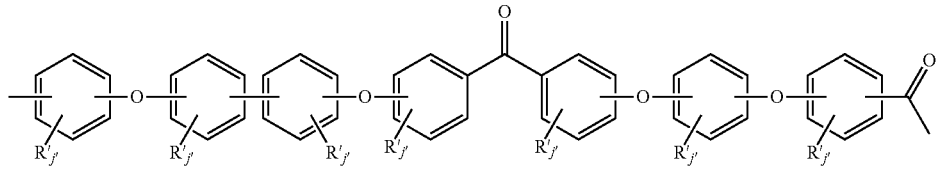
(J-H)

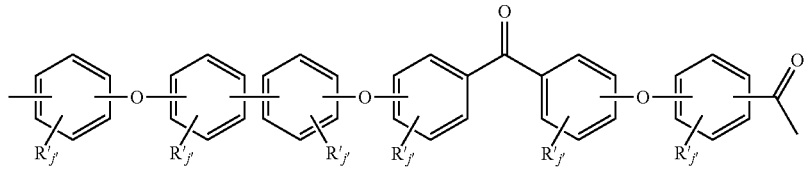
(J-I)

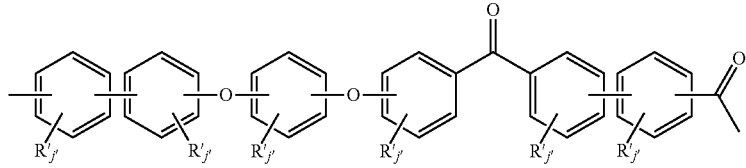
(J-J)

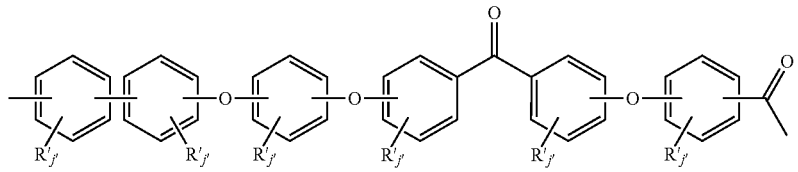
(J-K)

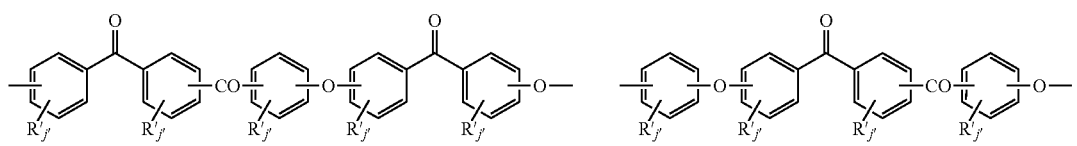
(J-L) (J-M)

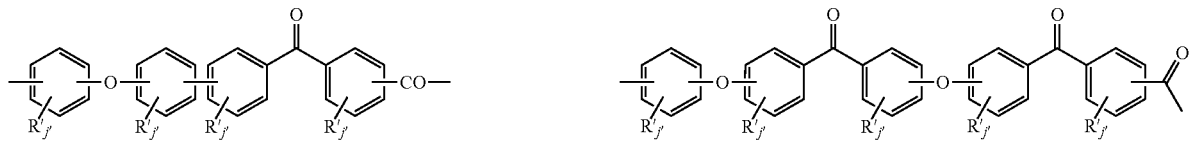
(J-N) (J-O)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and
j' is zero or is an integer from 0 to 4.

3. The mobile electronic device according to claim 1, wherein more than 50% moles of recurring units of the (PAEK) polymer are recurring units ($R_{PAEK}$) selected from those of formulae (J'-A) to (J'-O):

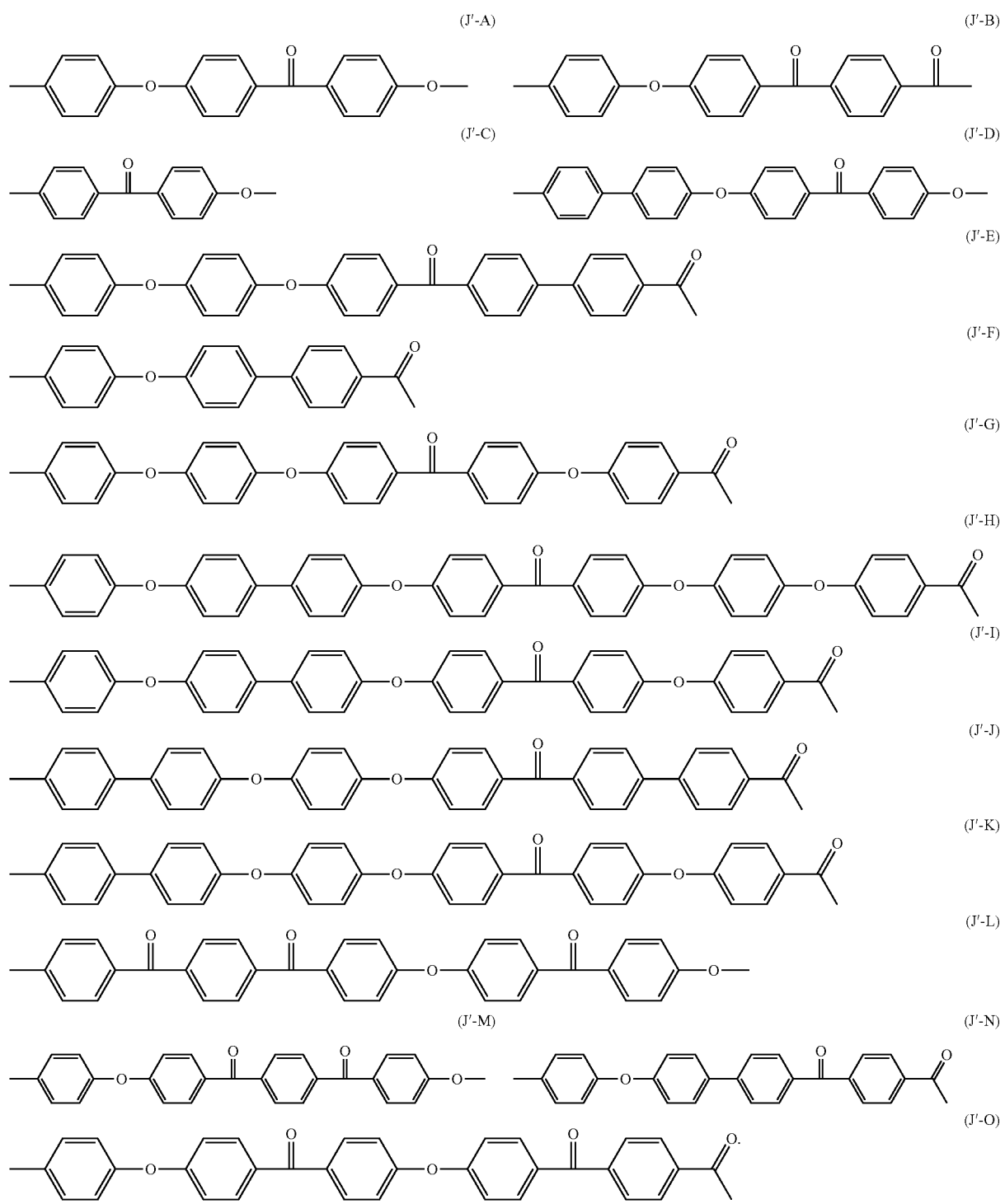

4. The mobile electronic device according to claim 1, wherein the nitride (NI) has an electronegativity of at least 1.6 to 2.5.

5. The mobile electronic device according to claim 1, wherein the nitride (NI) is boron nitride.

6. The mobile electronic device according to claim 1, wherein the nitride (NI) is present in an amount of at most 50.0% wt, based on a total weight of the polymer composition (C).

7. The mobile electronic device according to claim 1, wherein the polymer composition (C) further comprises at least one other thermoplastic polymer, (polymer T), different from the (PAEK) polymer.

8. The mobile electronic device according to claim 1, wherein the polymer composition (C) further comprises one or more ingredients other than the (PAEK) polymer, ingredient (I).

9. The mobile electronic device according to claim 1, wherein the polymer composition (C) further comprises at least one reinforcing filler.

10. The mobile electronic device according to claim 9, wherein the reinforcing filler is selected from wollastonite and glass fiber.

11. The mobile electronic device according to claim 9, wherein the reinforcing filler is a carbon fiber.

12. The mobile electronic device according to claim 1, wherein the part is a mobile electronic device housing.

13. The mobile electronic device according to claim 12, wherein the mobile electronic device housing is a mobile phone housing.

14. A method for manufacturing the part of the mobile electronic device according to claim 1, comprising a step of injection molding and solidification of the polymer composition (C).

15. A method for manufacturing the mobile electronic device according to claim 1, the method including the steps of:
   a. providing as components at least a circuit board, a screen, and a battery;
   b. providing the at least one part comprising the polymer composition (C);
   c. assembling at least one of the components with the part, or mounting at least one of the components on the part.

* * * * *